3,222,334
N,N-DIALKYLHYDROXYLAMINES AS SHORT-STOPPING AGENTS FOR EMULSION POLYMERIZATIONS
Fred P. Demme, Mexico City, Mexico, assignor to Pennsalt Chemicals Corporation, Philadelphia, Pa., a corporation of Pennsylvania
No Drawing. Filed Sept. 8, 1960, Ser. No. 54,596
15 Claims. (Cl. 260—84.7)

This invention relates to an improved process for short-stopping polymerization processes employing ethylenically unsaturated monomers and deals particularly with those polymerization processes for making synthetic rubber latices.

Synthetic rubber latices are prepared commercially by emulsion polymerization of rubber-forming monomers and the polymerization must be stopped to give a product of desired optimum characteristics. Much study has been made toward finding good shortstops and numerous compounds have been found quite useful. However, the compounds used heretofore have certain disadvantages and are not generally satisfactory with all types of polymerization systems. For example, hydroquinone has been used in hot butadiene-styrene systems, but it does not satisfactorily shortstop cold rubber polymerization processes where a more powerful initiator (e.g., hydroperoxide) is used. Although dinitrochlorobenzene has been used in cold rubber processes, it has the severe disadvantage of causing discoloration of the rubber; it is also water-insoluble and so toxic as to be a serious health problem to workers in the plant. The alkali metal salts, particularly the sodium salts, of di-lower-alkyldithiocarbamates (e.g., sodium dimethyldithiocarbamate) have been used quite successfully in both hot and cold polymerization recipes, but this compound has the disadvantage of being oxidized to a thiuram disulfide which remains in the finished rubber and causes undesirable and uncontrollable variation in vulcanization rate. Hydroxylamine and hydroxylamine salts such as the sulfate and hydrochloride have also been disclosed as shortstops for persulfate catalyzed emulsion polymerization processes (see U.S.P. 2,444,801), but they are not considered sufficiently effective for commercial use in cold polymerization recipes.

It has now been found surprisingly that N,N-dialkylhydroxylamines are excellent shortstops which are effective for both hot and cold emulsion polymerization processes. In addition, the N,N-dialkylhydroxylamines are significantly more effective than hydroxylamine or its salts. Further, the N,N-dialkylhydroxylamines are non-toxic, are nondiscoloring and have no adverse effect on the processed and cured rubber products in which they are used.

In carrying out the process of this invention, conventional polymerization recipes may be used and the shortstop added in the usual manner. For example, hot synthetic rubber recipes (persulfate or azonitrile initiated) or cold synthetic rubber recipes (hydroperoxide initiated) may be used. The polymerizable material for preparing synthetic rubber latices may be, as is well known, any one or more conjugated diolefins or their admixture with a copolymerizable monoolefin. The conjugated diolefins are exemplified by the butadienes such as butadiene-1,3, isoprene, chloroprene, cyanobutadiene-1,3, 2-phenylbutadiene, piperylene, 2,3-dimethylbutadiene-1,3, and the like. The copolymerizable monomer, which will normally comprise up to about 70% of the mixture, will be a monoolefin containing a single $CH_2=C$ group having at least one of the free valence bonds attached to an electronegative group. Such olefins include aryl olefins such as styrene, vinyl naphthalene, α-methylstyrene, p-chlorostyrene, etc.; the α-methylene carboxylic acids and their esters, amides and nitriles such as acrylic acid, methacrylic acid, acrylonitrile, methacrylamide, and the like. Thus, the synthetic rubber may be any butadiene polymer latex. However, it will be understood that the N,N-dialkylhydroxylamines may also be used in accord with this invention to stop polymerization of other ethylenically unsaturated monomers which yield non-elastomeric latices. Thus, this invention may also be used in the polymerization of vinyl and vinylidene halides (e.g., vinyl chloride, vinylidene fluoride, etc.), acrylates, methacrylates and acrylamides (methyl acrylate, glycidyl methacrylate, methacrylamide, etc.), vinyl esters (e.g., vinyl acetate, etc.), and in fact in any addition polymerization system where polymerization proceeds through a free radical mechanism.

The addition of the shortstop agent will be made after the desired degree of polymerization has occurred. The amount added will be that required to retard or stop the polymerization as desired and the amount is not critical. However, the amount of agent usually used will be between about 0.01 and about 2.0 parts per hundred parts of monomer (p.h.m.) with about 0.05 to about 0.2 p.h.m. being preferred. As little as 0.001 p.h.m. will show the effect, but for practical purposes at least about 0.025 p.h.m. will be used. Using more than 2 p.h.m. is not necessary and is wasteful of material.

The shortstops used in the process of this invention may be any N,N-dialkylhydroxylamine and the term alkyl is meant to include cycloalkyl. Because of availability the N,N-dialkylhydroxylamines containing up to about eighteen carbon atoms in each alkyl group will be used, and each of the alkyl groups on the nitrogen atom of the hydroxylamine may be different. It is preferred to use those N,N-dialkylhydroxylamines containing up to 6 carbon atoms in each alkyl group and because of cost and availability the most preferred agents are those containing from one to three carbon atoms in each alkyl group. Specific compounds which are operable in this invention include N,N-dimethylhydroxylamine, N,N-diethylhydroxylamine, N,N-di-n-propylhydroxylamine, N,N-diisopropylhydroxylamine, N,N-di-normal butylhydroxylamine, the N,N-diamylhydroxylamines, N,N-dicyclohexylhydroxylamine, N-methyl-N-ethylhydroxylamine, N,N-di-decylhydroxylamine, N,N-dioctadecylhydroxylamine, N-methyl-N-cyclohexylhydroxylamine and the like. These compounds are known and may be prepared by any one of several known methods as, for example, by converting the appropriate tertiary amine to the amine oxide and pyrolyzing the oxide to the hydroxylamine and olefin as disclosed by Cope et al. in J. Am. Chem. Soc., 79, 964 (1957). The following examples will serve to further illustrate the invention:

POLYMERIZATION PROCEDURE

The polymerizations were carried out in glass beverage bottles having a capacity of 220 ml. The bottle was placed in a metal guard which was then clamped in a small wheel-type polymerizer. The wheel of this polymerizer rotated in a water bath held at 50°±1° C. Perforated bottle caps were employed to permit sampling of the recipe and injection of stopping agent into the bottles by means of a hypodermic needle and syringe. The percent conversion for a given polymerization time was determined by measuring total solids of the recipe at that particular time, and estimating conversion from a total solids-conversion straight line relationship. Total solids of the recipe was determined by drying a weighed sample of the latex in a weighed aluminum dish by means of an infrared lamp for about 10 minutes followed by a short period of heating in an oven at 70° C. The stopping agent was added to the polymerization system as a dilute aqueous solution and the temperature of the polymerization was maintained as conversions were determined at various times.

*Example 1.—Hot rubber recipe—persulfate with butadiene-styrene (SBR 1000)*

The following butadiene-styrene recipe (SBR 1000) was polymerized:

| | Parts by weight |
|---|---|
| Water | 45.0 |
| Sodium fatty acid soap | 1.18 |
| $K_2S_2O_8$ | 0.063 |
| Modifier (tert-dodecyl mercaptan) | 0.075 |
| Butadiene | 18.0 |
| Styrene | 7.0 |

The following Table I shows the results of shortstopping the polymerization with various agents:

*Example 2.—Hot rubber recipe—Persulfate initiated polychloroprene*

The following recipe was polymerized at 40° C.:

| | Parts by weight |
|---|---|
| Water | 37.5 |
| Nancy wood rosin | 1.0 |
| NaOH | 0.2 |
| $K_2S_2O_8$ | 0.05 |
| Sulfur | 0.15 |
| Dispersant* | 0.19 |
| Chloroprene | 25.0 |

*Daxad–11, polymerized sodium salts of short chain alkyl naphthalene sulfonic acid.

Three sets of experiments were carried out under identical conditions using no agent, a prior art stopping agent, and a N,N-dialkylhydroxylamine agent. The following Table II shows the conditions and agents for each set of polymerization runs:

TABLE II

| Stopping Agent | Concentration (p.h.m.) | Percent Conversion | | | |
|---|---|---|---|---|---|
| | | When Agent Added | At Time After Adding Agent | | |
| | | | 1 Hour | 18 Hours | 24 Hours |
| A | | | | | |
| None | | 60.4 | | 72.0 | 74.0 |
| Hydroquinone | 0.15 | 59.5 | 59.3 | 61.5 | 61.7 |
| N,N-Diethylhydroxylamine | 0.15 | 57.5 | 57.4 | 57.8 | 57.6 |
| B | | | | | |
| None | | 39.1 | 53.5 | 72.3 | 72.7 |
| Hydroxylamine sulfate | 0.15 | 36.5 | 38.3 | 53.6 | 54.1 |
| N,N-Diethylhydroxylamine | 0.15 | 37.2 | 37.3 | 37.8 | 37.8 |
| C | | | | | |
| None | | 32.9 | 42.9 | 65.0 | 66.0 |
| Hydroxylamine sulfate | 0.15 | 33.3 | 34.3 | 46.6 | 47.3 |
| N,N-Dimethylhydroxylamine | 0.15 | 32.2 | 32.2 | 33.3 | 33.8 |

*Example 3.—Cold rubber recipe—Hydroperoxide with butadiene-styrene (SBR 1500)*

Following the general polymerization procedure, the following cold rubber recipe (SBR 1500) was run at 5° C. to test several shortstop agents:

| | Parts by weight |
|---|---|
| Water | 50.0 |
| Rosin acid soap (Dresinate 214) | 1.125 |
| Iron sequestrant (Versene Fe3) | 0.005 |
| $Na_3PO_4 \cdot 12H_2O$ | 0.075 |
| Dispersant (Daxad–11) | 0.025 |
| Modifier (tert-dodecyl mercaptan) | 0.05 |
| p-Menthane hydroperoxide | 0.02 |
| $FeSO_4 \cdot 7H_2O$ | 0.03 |
| $K_4P_2O_7$ | 0.037 |
| Butadiene | 18.0 |
| Styrene | 7.0 |

In order to make the test more stringent, the temperature of the polymerization was raised to 50° C. one hour after

TABLE I

| Stopping Agent | Concentration Used (p.h.m.)* | Percent Conversion | | | |
|---|---|---|---|---|---|
| | | When Stopped | After 1 Hr. | After 18 Hrs. | After 24 Hrs. |
| None | | 40.7 | | 92.3 | 95.0 |
| Hydroquinone | 0.15 | 40.7 | 40.6 | 40.8 | 40.9 |
| Hydroxylamine sulfate | 0.15 | 40.7 | 43.6 | 78.1 | 83.3 |
| $(C_2H_5)_2NOH$ | 0.15 | 40.7 | 40.5 | 41.0 | 41.0 |

*P.h.m.=Parts per hundred parts monomer.

the shortstop was added. The following Table III illustrates the conditions used and the results obtained:

and by touch at periodic intervals to determine changes in color, surface softness, relative state of cure and

TABLE III

| Stopping Agent | Concentration of Agent Used (p.h.m.) | Per Cent Conversion | | | |
|---|---|---|---|---|---|
| | | When Stopped | Aft. 1 hr. at 5° C. | Aft. 18 hrs. at 50° C. | Aft. 24 hrs. at 50° C. |
| None | | 64.7 | | 96.2 | 95.9 |
| Sodium dimethyldithiocarbamate | 0.15 | 64.7 | 60.1 | 61.0 | 60.7 |
| | 0.10 | 64.7 | 65.5 | 65.5 | 65.8 |
| | 0.05 | 64.7 | 65.0 | 65.5 | 65.5 |
| | 0.01 | 64.7 | 67.2 | 78.5 | 79.5 |
| | 0.005 | 61.4 | 69.0 | 87.8 | 87.8 |
| N,N-Diethylhydroxylamine | 0.15 | 64.7 | 64.8 | 65.3 | 65.2 |
| | 0.05 | 64.7 | 65.5 | 65.1 | 66.5 |
| | 0.01 | 64.7 | 65.5 | 66.8 | 67.5 |
| | 0.005 | 61.4 | 66.6 | 87.0 | 87.8 |
| N,N-di-Isopropylhydroxylamine | 0.15 | 66.6 | 66.9 | 67.2 | 66.6 |
| | 0.05 | 66.6 | 67.0 | 67.6 | 67.5 |
| | 0.01 | 66.6 | 68.1 | 69.1 | 68.7 |
| Hydroxylamine sulfate | 0.15 | 66.6 | 69.3 | 78.6 | 81.7 |
| | 0.05 | 66.6 | 72.6 | 87.9 | 90.2 |
| | 0.01 | 66.6 | 76.3 | 91.3 | 91.3 |

It is readily seen from the above that the N,N-dialkyl-hydroxylamines are equal or superior to the commercially used dithiocarbamate. In contrast, hydroxylamine sulfate is of little value even at the highest concentration tested.

*Example 4.—Hot rubber recipe—α,α'-azodi-iso-butyronitrile with butadiene-styrene*

The following recipe was polymerized:

|  | Parts by weight, g. |
|---|---|
| Water | 111.0 |
| Sodium hydroxide | 0.18 |
| Sodium fatty acid soap | 2.50 |
| Modifier (tert-dodecyl mercaptan) | 0.18 |
| α,α'-Azodi-iso-butyronitrile | 0.05 |
| Styrene | 15.3 |
| Butadiene | 46.0 |

The results obtained with various agents are shown in Table IV in col 6.

*Example 5.—Effect of stopping agents on stability of elastomer*

Using the recipe and polymerization procedure of Example 3, two samples of a cold butadiene-styrene elastomer were prepared. With one sample the polymerization was stopped at 60% conversion with 0.15 part per hundred parts of monomers of N,N-diethylhydroxylamine and with the second sample polymerization was stopped at 60% conversion with 0.15 p.h.m. of sodium dimethyl dithiocarbamate. Each of the latices was crumb coagulated and the wet crumb dried for 16 hours at 70° C. in a circulating air oven.

Each of the rubber samples was subjected to a polymer stability test which is carried out as follows:

Samples of the experimental elastomers are held for 96 hours at 100° C. and during this time are inspected visually

TABLE IV

| Agent | Concentration (Parts per 100 parts rubber) | Time of Polymerization (Hours) | Percent Conversion |
|---|---|---|---|
| None (Control) | | 18 | 24.4 |
| | | 35 | 58.0 |
| | | 38 | 62.0 |
| | | 40 | 65.0 |
| N,N-Diethylhydroxyl-amine. | 1.0 | 17 | 21.95 |
| | | *35 | 57.7 |
| | | 38 | 61.2 |
| | | 40 | 60.6 |
| | 0.10 | 18 | 23 |
| | | 35 | 59.5 |
| | | *36 | |
| | | 38 | 60.0 |
| | | 41 | 60.1 |
| | 0.001 | 18 | 9.9 |
| | | 35 | 57.9 |
| | | *37 | |
| | | 39 | 62.0 |
| | | 41 | 59.9 |
| N,N-Diisopropylhydroxyl-amine. | 1.0 | 18 | 24.4 |
| | | 35.5 | 60.6 |
| | | *36.5 | |
| | | 38 | 60.7 |
| | | 41 | 60.5 |
| | 0.01 | 18 | 25.2 |
| | | 35.5 | 61.5 |
| | | *36.5 | |
| | | 39 | 61.6 |
| | | 41 | 59.9 |

*Time at which stopping agent added.

whether or not the crumbs fused together. The following Table V shows the results obtained and clearly demonstrates that the elastomer prepared when using the N,N-dialkylhydroxylamine stopping agent is equivalent to the sample containing commercial N,N-dimethyldithio-carbamate shortstop.

TABLE V—POLYMER STABILITY TEST

| Coagulated crumbs from SBR-1500 Emulsion stopped with— | Visual Observation on Polymer | | | |
|---|---|---|---|---|
| | Color | Fusion | Surface softness | Relative State of Cure |
| A. 0.15 p.h.m. (C$_2$H$_5$)$_2$N-OH: After— | | | | |
| 8 hrs | Pale yellow | None | Slightly hard | Extremely slight. |
| 24 hrs | Pale orange | do | Hard | Do. |
| 48 hrs | Tan | do | do | Do. |
| 72 hrs | do | do | do | Do. |
| 96 hrs | do | do | do | Do. |
| B. 0.15 p.h.m. (CH$_3$)$_2$N-$\overset{\overset{S}{\|}}{C}$-S-Na: After— | | | | |
| 8 hrs | Slight darkening. | Extremely slight. | No change | Very slight. |
| 24 hrs | do | do | do | Do. |
| 48 hrs | Tan | Slightly fused | Hard | Slight tensile. |
| 72 hrs | do | do | do | Do. |
| 96 hrs | do | do | do | Do. |

It is apparent from the above description of the invention and from the experimental data shown that the use of N,N-dialkylhydroxylamines as shortstops in the preparation of synthetic polymers permits excellent control of the polymerization process, providing a sure and effective means for stopping the process when desired. These and other advantages of the N,N-dialkylhydroxylamines, particularly with regard to (a) their versatility for both hot and cold synthetic rubber recipes, (b) their non-toxic and non-discoloring nature, (c) their effectiveness at low concentration, (d) their compatibility with the finished rubber product, and (e) their innocuous effects on the rubber make it obvious that this invention is a significant advance in the art of polymer science.

I claim:
1. In the process of preparing a synthetic rubber latex by polymerizing a conjugated diolefin by addition through a free radical mechanism and terminating the polymerization by the addition of a stopping agent, the improvement which comprises using as said stopping agent an N,N-dialkylhydroxylamine containing from one to eighteen carbon atoms in each alkyl group.
2. The process of claim 1 wherein the conjugated diolefin is a butadiene.
3. In the process of preparing a butadiene polymer synthetic rubber latex by addition polymerization through a free radical mechanism, the improvement which comprises stopping the polymerization with an N,N-dialkylhydroxylamine which contains from one to six carbon atoms in each alkyl group.
4. The process of claim 3 wherein the polymer latex is a hot butadiene polymer synthetic rubber latex.
5. The process of claim 3 wherein the polymer latex is a cold butadiene polymer synthetic rubber latex.
6. The process of claim 3 wherein the polymer latex is a hot butadiene-styrene synthetic rubber latex.
7. The process of claim 3 wherein the polymer latex is a cold butadiene-styrene synthetic rubber latex.
8. The process of claim 3 wherein the butadiene polymer is a copolymer of styrene and butadiene.
9. The process of claim 3 wherein the butadiene polymer is polychloroprene.
10. The process of claim 3 wherein the stopping agent is N,N-dimethylhydroxylamine.
11. The process of claim 3 wherein the stopping agent is N,N-diethylhydroxylamine.
12. The process of claim 3 wherein the stopping agent is N,N-diisopropylhydroxylamine.
13. In the process of preparing a synthetic rubber latex by polymerizing a conjugated diolefin by addition polymerization through a free radical mechanism and terminating the polymerization by the addition of a stopping agent, the step which comprises stopping the polymerization with from about 0.01 to about 0.1 part per hundred parts of monomers of an N,N-dialkylhydroxylamine containing from 1 to 6 carbon atoms in each alkyl group.
14. In the process of preparing a cold butadiene-styrene synthetic rubber latex by addition polymerization through a free radical mechanism, the improvement which comprises the step of stopping the polymerization with from about 0.01 to 0.1 part per hundred parts of monomers of an N,N-dialkylhydroxylamine which contains from 1 to 6 carbon atoms in each alkyl group.
15. The process of claim 14 wherein the stopping agent is N,N-diethylhydroxylamine.

References Cited by the Examiner
UNITED STATES PATENTS

| | | | |
|---|---|---|---|
| 2,444,801 | 7/1948 | Arundale | 260—83.3 XR |
| 2,514,363 | 7/1950 | Banes | 260—94.6 |
| 2,556,651 | 6/1951 | Howland | 260—94.6 |
| 2,965,685 | 12/1960 | Campbell | 260—45.8 |
| 3,148,225 | 9/1964 | Albert | 260—94.7 |

OTHER REFERENCES

Bovey et al., Emulsion Polymerization, Interscience, New York, 1955, pages 207, 234–235 relied on.

JOSEPH L. SCHOFER, *Primary Examiner.*

M. LIEBMAN, *Examiner.*